US010746691B1

(12) United States Patent
Cheng et al.

(10) Patent No.: US 10,746,691 B1
(45) Date of Patent: Aug. 18, 2020

(54) ION-SENSITIVE FIELD EFFECT TRANSISTOR (ISFET) WITH ENHANCED SENSITIVITY

(71) Applicant: International Business Machines Corporation, Armonk, NY (US)

(72) Inventors: Kangguo Cheng, Schenectady, NY (US); Chanro Park, Clifton Park, NY (US); Ruilong Xie, Niskayuna, NY (US); Juntao Li, Cohoes, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/281,183

(22) Filed: Feb. 21, 2019

(51) Int. Cl.
*G01N 27/414* (2006.01)

(52) U.S. Cl.
CPC ................... *G01N 27/414* (2013.01)

(58) Field of Classification Search
CPC ............ G01N 27/414; G01N 27/4145; G01N 27/4148
See application file for complete search history.

(56) References Cited

U.S. PATENT DOCUMENTS

| 8,466,521 | B2 | 6/2013 | Wey et al. |
| 9,518,953 | B2 * | 12/2016 | Nemirovsky ...... G01N 27/4146 |
| 9,528,962 | B2 | 12/2016 | Li et al. |
| 9,978,689 | B2 | 5/2018 | Hoque et al. |
| 9,995,708 | B2 | 6/2018 | Fife et al. |
| 2011/0299337 | A1* | 12/2011 | Parris ............... H01L 27/11558 365/185.18 |
| 2017/0153201 | A1 | 6/2017 | Li et al. |

FOREIGN PATENT DOCUMENTS

WO     2012152308 A1    11/2012

OTHER PUBLICATIONS

Pachauri, V., et al., "Field-effect-based chemical sensing using nanowire-nanoparticle hybrids: The ionsensitive metal-semiconductor field-effect transistor", American Institute of Physics, published online Jan. 15, 2013, pp. 023501-1 to 023501-5, 102.

* cited by examiner

*Primary Examiner* — Andrew Q Tran
(74) *Attorney, Agent, or Firm* — Scully, Scott, Murphy & Presser, P.C; L. Jeffrey Kelly, Esq.

(57) ABSTRACT

An ion-sensitive field effect transistor (ISFET) is provided that has enhanced sensitivity due to an increased passivation capacitance, $C_p$. The increased $C_p$ is obtained by increasing the surface area of the passivation layer by forming particles (metallic, semiconductor or dielectric) in a micro-well, and by embedding the particles in an electrically conductive liner that is formed under the passivation layer and within the micro-well.

20 Claims, 10 Drawing Sheets

ION-SENSITIVE FIELD EFFECT TRANSISTOR (ISFET) WITH ENHANCED SENSITIVITY

BACKGROUND

The present application relates to a sensor for chemical sensing or bio-sensing applications, and a method of forming the same. More particularly, the present application relates to an ion-sensitive field effect transistor (ISFET) having an increased passivation capacitance, $C_p$, and enhanced sensitivity.

Ion-sensitive field effect transistors (ISFETs) are being explored as a biosensor or a chemical sensor. ISFETs can be fabricated along with a standard metal oxide semiconductor field effect transistor (MOSFET) to make a 'lab-on-chip' in which the ISFETs are used as sensors and the MOSFETS are used for signal processing.

In prior art ISFETs, a passivation layer such as, for example, a layer of silicon nitride, is typically formed above the last metal layer of a back-end-of-the-line (BEOL) structure, and a micro-well is formed in a dielectric material that is disposed above the passivation layer. The passivation layer serves two proposes. Firstly, the passivation layer prevents ions such as, for example, sodium ions and/or potassium ions, from traveling into the underlying transistor. Secondly, the passivation layer serves as a sensing layer to absorb electric charges from the analyte-containing solution to the surface of the passivation layer. In such ISFETs, the amount of electrical charges is measured by the threshold voltage change of the underlying transistor, thus the analyte (bio or chemical) in the micro-well is sensed.

Although passivation is necessary, the presence of the passivation layer in the ISFET reduces the sensitivity of the underlying transistor because the passivation layer creates a capacitance (often referred to as a passivation capacitance, $C_p$) in series with the FET capacitance ($C_{FET}$). Compared with a case without a passivation layer (i.e., the analyte directing contacting the FET), the sensitivity of the ISFET is reduced to a factor A, where A can be expressed as $A=C_p/(C_p+C_{FET})$, wherein $C_p$ and $C_{FET}$ are as defined above.

The passivation layer is typically much thicker than the gate dielectric of the FET. Therefore, $C_p$ is much less than $C_{FET}$. As a result, A is much less than 1. Therefore, there is a need to improve the sensitivity of an ISFET by increasing $C_p$.

SUMMARY

An ion-sensitive field effect transistor (ISFET) is provided that has enhanced sensitivity due to an increased passivation capacitance, $C_p$. The increased $C_p$ is obtained by increasing the surface area of the passivation layer by forming particles (metallic, semiconductor or dielectric) in a micro-well, and by embedding the particles in an electrically conductive liner that is formed under the passivation layer and within the micro-well.

In one aspect of the present application, an ion-sensitive field effect transistor (ISFET) is provided. In one embodiment, the ISFET includes a functional gate structure located on a surface of a semiconductor material substrate and embedded in a dielectric material stack. A micro-well is located above the dielectric material stack and physically exposes a portion of the dielectric material stack that is located above the functional gate structure. The micro-well is laterally surrounded by a micro-well containing structure. A plurality of particles is located inside the micro-well and on physically exposed sidewalls of the micro-well containing structure and the physically exposed portion of the dielectric material stack. An electrically conductive liner is located in the micro-well and embeds each particle of the plurality of particles. A sensing layer is located on the electrically conductive liner and extends onto a topmost surface of the micro-well containing structure.

In another aspect of the present application, a method of forming an ion-sensitive field effect transistor (ISFET) is provided. In one embodiment, the method includes forming a structure including a functional gate structure on a surface of a semiconductor material substrate and embedded in a dielectric material stack, and a dielectric material layer located on the dielectric material stack. Next, a micro-well is formed into the dielectric material layer which physically exposes the dielectric material stack. Particles are thereafter formed on physically exposed surfaces that are located at least inside the micro-well. Next, an electrically conductive liner is formed inside the micro-well and embedding each particle. A passivation layer is formed inside and outside of the micro-well.

DETAILED DESCRIPTION

Figure 1:
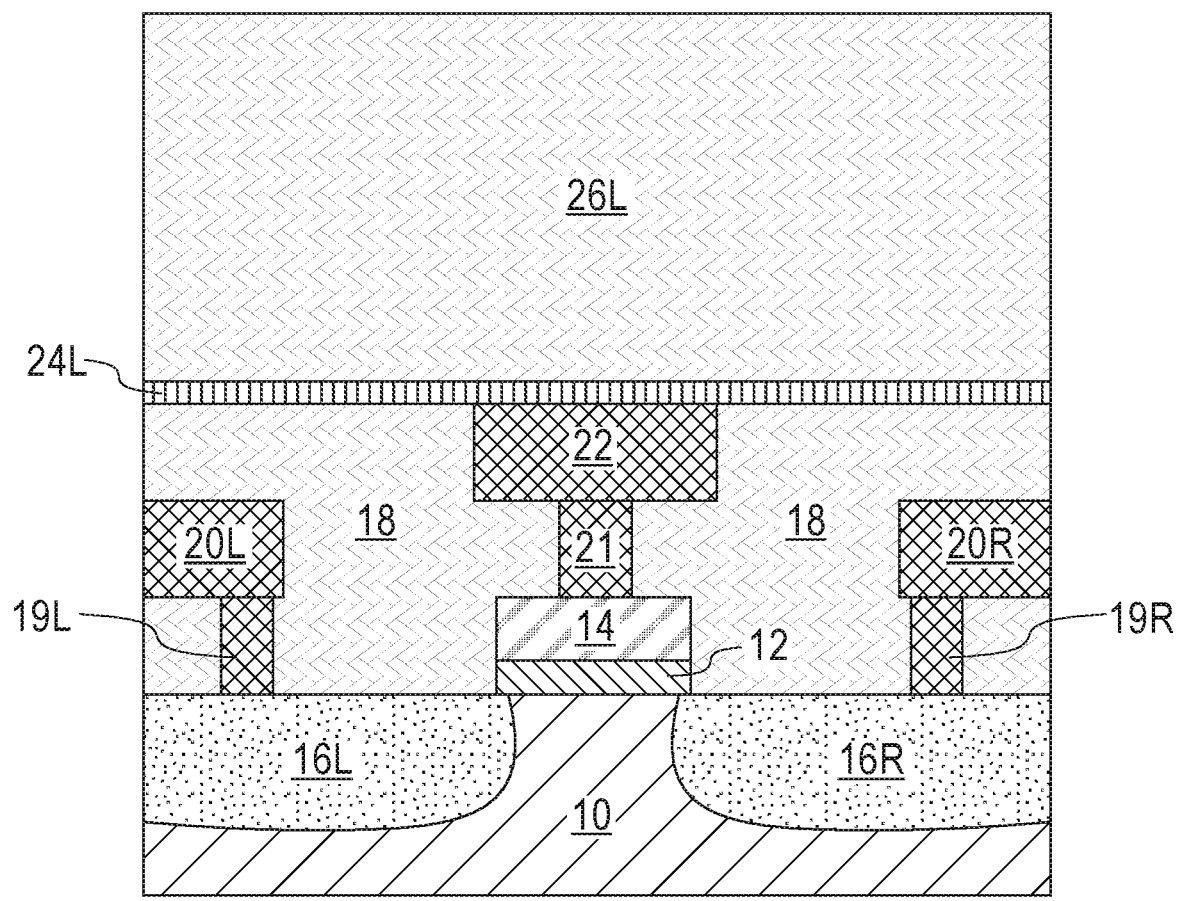
FIG. 1 is a cross sectional view of an exemplary structure including a gate structure of a field effect transistor located on a surface of a semiconductor material substrate and embedded in a dielectric material stack that contains a plurality of electrically conductive structures embedded therein, an etch stop layer located on the dielectric material stack, and a dielectric material layer located on the etch stop layer that can be employed in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary structure that can be employed in accordance with an embodiment of the present application. The exemplary structure of FIG. 1 includes a gate structure (12, 14) of a field effect transistor (FET) located on a surface of a semiconductor material substrate 10 and embedded in a dielectric material stack 18 that contains a plurality of electrically conductive structures (19L, 19R, 20L, 20R, 21 and 22) embedded therein, an etch stop layer 24L located on the dielectric material stack 18, and a dielectric material layer 26L located on the etch stop layer 24L. In some embodiments (not shown), the etch stop layer 24L can be omitted and the dielectric material layer 26L can be formed directly on the dielectric material stack 18 that contains the plurality of electrically conductive structures (19L, 19R, 20L, 20R, 21 and 22) embedded therein.

Although the present application describes and illustrates a single FET, the present application can also be employed when a plurality of FETs are formed. Further, although the present application describes and illustrates a planar FET, the present application can also be employed when non-planar FETs such as, for example, FinFETs and gate-all-around FETs such as, for example nanowire FETs, nanosheet FETs and vertical FETs, are formed.

The gate structure (12, 14) is a "functional gate structure". By "functional gate structure" it is meant an active gate structure used to control output current (i.e., flow of carriers in the channel) of a semiconducting device through electrical or magnetic fields. The gate structure (12, 14) includes a gate dielectric material 12 and a gate conductor material 14.

In one embodiment of the present application, the exemplary semiconductor structure of FIG. 1 can be formed utilizing a gate first process. In a gate first process, the gate structure (12, 14) is first formed on a surface of semiconductor material substrate 10. After forming the gate structure (12, 14), a dielectric spacer (not shown) can be formed on the sidewalls of the gate structure (12, 14). Source/drain regions 16L, 16R are formed into the semiconductor material substrate 10 and at the footprint of each gate structure (12, 14). In such an embodiment, the gate dielectric material 12 is located only beneath a bottommost surface of the gate conductor material 14. Next, the dielectric material stack 18 that contains a plurality of electrically conductive structures (19L, 19R, 20L, 20R, 21 and 22) embedded therein is formed, followed by the formation of the optional etch stop layer 24L and the dielectric material layer 26L.

In another embodiment of the present application, the exemplary semiconductor structure of FIG. 1 can be formed utilizing a gate last process. In a gate last process, at least one sacrificial gate structure (not shown) is first formed on a surface of semiconductor material substrate 10. After forming the sacrificial gate structure, dielectric spacers (not shown) may be formed. Next, source/drain regions 16L, 16R are formed into the semiconductor material substrate 10 and at the footprint of each sacrificial gate structure. Next, an interlayer dielectric (ILD) material (which may represent a lower portion of the dielectric material stack 18) is formed. After forming the ILD material, each sacrificial gate structure is removed and replaced with a functional gate structure (i.e., gate structure (12, 14)). In such an embodiment (not shown), the gate last process provides a structure in which the gate dielectric material 12 is present along the sidewalls of the gate conductor material 14 and beneath a bottommost surface of the gate conductor material 14. In such an embodiment, the gate dielectric material 12 may be referred to as a U-shaped gate dielectric material layer. The remaining portion of the dielectric material stack 18 is then formed, followed by the formation of the optional etch stop layer 24L and the dielectric material layer 26L.

The semiconductor material substrate 10 of the present application is composed of one or more semiconductor materials having semiconducting properties. Examples of semiconductor materials that may be used as the semiconductor material substrate 10 include, but are not limited to, silicon (Si), a silicon germanium (SiGe) alloy, a silicon germanium carbide (SiGeC) alloy, germanium (Ge), a III/V compound semiconductor, or a II/VI compound semiconductor.

In one embodiment, the semiconductor material substrate 10 may be a bulk semiconductor substrate. The term "bulk semiconductor substrate" denotes a substrate that is composed entirely of one or more semiconductor materials, as defined above. In such an embodiment, the gate structure (12, 14) is located only upon a topmost surface of the semiconductor material substrate 10.

In another embodiment, the semiconductor material substrate 10 may be a topmost semiconductor material layer of a semiconductor-on-insulator (SOI) substrate. The SOI substrate further include an insulator layer that contacts a bottommost surface of the topmost semiconductor material layer, and a handle substrate that contacts a bottommost surface of the insulator layer; in other terms an SOI substrate includes an insulator layer sandwiched between a topmost surface material layer and a handle substrate. In such an embodiment, the gate structure (12, 14) is located only upon a topmost surface of the semiconductor material substrate 10.

In a further embodiment of the present application, the semiconductor material substrate 10 may be a semiconductor material fin. The term "semiconductor material fin" refers to a structure composed of a semiconductor material, as defined above, that includes a pair of vertical sidewalls that are parallel to each other. A surface is "vertical" if there exists a vertical plane from which the surface does not deviate by more than three times the root mean square roughness of the surface. In one embodiment, the semiconductor material fin has a height from 20 nm to 200 nm, a width from 5 nm to 30 nm, and a length from 20 nm to 200 nm. Other heights and/or widths and/or lengths that are lesser than, or greater than, the ranges mentioned herein can also be used in the present application. In such an embodiment, a single semiconductor material fin or a plurality of semiconductor material fins may be employed. The semiconductor material fin(s) can be formed by patterning an upper portion of a bulk semiconductor substrate, as defined above, or by patterning of a topmost semiconductor layer of a SOI substrate, as defined above. Patterning may be performed by lithography and etching, a sidewall image transfer (SIT) process or by direct self-assembly (DSA) process in which a copolymer that is capable of direct self-assembly is used.

In a yet further embodiment of the present application, the semiconductor material substrate 10 may be a semiconductor nanowire. The term "semiconductor nanowire" refers to a structure composed of a semiconductor material, as defined above, that has a diameter on the order of a few nanometers or less. A single semiconductor nanowire or a plurality of semiconductor nanowires may be employed. When a plurality of nanowires is employed, the nanowires may be in a vertical stacked configuration or they may be located laterally adjacent to each other. The semiconductor nanowire(s) can be formed utilizing techniques well known to those skilled in the art. The semiconductor material substrate 10 can also be a semiconductor nanosheet. A semiconductor nanosheet is a sheet of a semiconductor material. The nanosheets may be formed utilizing techniques well known to those skilled in the art.

The source/drain regions 16L, 16R are composed of a semiconductor material, as defined above, and a p-type dopant or an n-type dopant. Typically, but not necessarily always, the source/drain regions 16L, 16R are composed of a same semiconductor material as the semiconductor material substrate 10. In embodiments in which the source/drain regions 16L, 16R are composed of a different semiconductor material than the semiconductor material substrate 10, a strain may be applied to a channel region of the gate structure (12, 14). As is known to those skilled in the art, the channel region is a portion of the semiconductor material substrate 10 that is located beneath a functional gate structure (i.e., gate structure (12, 14)) and between a source region that is located on one side of the functional gate structure, and a drain region that is located on the other side of the functional gate structure. In the present application one of 16L, 16R is the source region, and the other of 16L, 16R is a drain region. The source region and the drain region are referred to herein as source/drain regions 16L, 16R. The term "p-type" refers to the addition of impurities to an intrinsic semiconductor that creates deficiencies of valence electrons. In a silicon-containing semiconductor material, examples of p-type dopants, i.e., impurities, include, but are not limited to, boron, aluminum, gallium and indium. "N-type" refers to the addition of impurities that contributes free electrons to an intrinsic semiconductor. In a silicon containing semiconductor material, examples of n-type dopants, i.e., impurities, include, but are not limited to, antimony, arsenic and phosphorous. In one example, the source/drain regions may have a dopant concentration of from $1 \times 10^{20}$ atoms/cm$^3$ to $3 \times 10^{21}$ atoms/cm$^3$.

In some embodiments, the source/drain regions 16L, 16R can be formed by introducing a p-type dopant or an n-type dopant, as defined above, into portions of the semiconductor material substrate 10. The dopants may be introduced into portions of the semiconductor material substrate 10 by ion implantation, gas phase doping, plasma doping, plasma immersion ion implantation, cluster doping, infusion doping, liquid phase doping, solid phase doping, and/or any suitable combination of those techniques. In some embodiments, dopants are activated by thermal annealing such as laser annealing, flash annealing, rapid thermal annealing (RTA) or any suitable combination of those techniques.

In another embodiment, the source/drain regions 16L, 16R can be formed by forming source/drain trenches into the semiconductor material substrate 10 and thereafter filling each of the source/drain trenches with an n-type or p-type doped semiconductor material. The filling of the source/drain trenches may include an epitaxial growth process. The term "epitaxial growth" means the growth of a second semiconductor material on a growth surface of a first semiconductor material, in which the second semiconductor material being grown has the same crystalline characteristics as the first semiconductor material. In an epitaxial deposition process, the chemical reactants provided by the source gases are controlled and the system parameters are set so that the depositing atoms arrive at the growth surface of the first semiconductor material with sufficient energy to move around on the growth surface and orient themselves to the crystal arrangement of the atoms of the growth surface. Examples of various epitaxial growth process apparatuses that can be employed in the present application include, e.g., rapid thermal chemical vapor deposition (RTCVD), low-energy plasma deposition (LEPD), ultra-high vacuum chemical vapor deposition (UHVCVD), atmospheric pressure chemical vapor deposition (APCVD) and molecular beam epitaxy (MBE). The temperature for epitaxial deposition typically ranges from 550° C. to 900° C. Although higher temperature typically results in faster deposition, the faster deposition may result in crystal defects and film cracking. The epitaxial growth of the of the source/drain regions 16L, 16R can be performed utilizing any well-known precursor gas or gas mixture. Carrier gases like hydrogen, nitrogen, helium and argon can be used. In some embodiments, the n-type dopant or p-type dopant is introduced into the precursor gas or gas mixture. In other embodiments, the n-type dopant of p-type dopant is introduced into an intrinsic semiconductor material that is epitaxially grown into each source/drain trench.

As mentioned above, the gate structure (12, 14) includes gate dielectric material 12 and gate conductor material 14; a dielectric spacer (not shown) can be present along the sidewalls of the gate structure (12,14). The gate dielectric material 12 includes any gate dielectric material or multi-layered stack thereof. The gate dielectric material 12 can be composed of an oxide, nitride, and/or oxynitride. In one example, the gate dielectric material 12 can be a high-k material having a dielectric constant greater than 4.0; all dielectric constants mentioned herein are measured in a vacuum unless otherwise indicated. Exemplary high-k dielectrics include, but are not limited to, $HfO_2$, $ZrO_2$, $La_2O_3$, $Al_2O_3$, $TiO_2$, $SrTiO_3$, $LaAlO_3$, $Y_2O_3$, $HfO_xN_y$, $ZrO_xN_y$, $La_2O_xN_y$, $Al_2O_xN_y$, $TiO_xN_y$, $SrTiO_xN_y$, $LaAlO_xN_y$, $Y_2O_xN_y$, SiON, $SiN_x$, a silicate thereof, and an alloy thereof. Each value of x is independently from 0.5 to 3 and each value of y is independently from 0 to 2. In some embodiments, a multilayered gate dielectric structure composed of different gate dielectric materials, e.g., silicon dioxide, and a high-k gate dielectric, can be formed and used as the gate dielectric material 12.

The gate dielectric material 12 can be formed by any deposition process including, for example, atomic layer deposition (ALD), chemical vapor deposition (CVD), plasma enhanced chemical vapor deposition (PECVD), physical vapor deposition (PVD), sputtering, or atomic layer deposition. In one embodiment of the present application, the gate dielectric material 12 can have a thickness in a range from 1 nm to 10 nm. Other thicknesses that are lesser than, or greater than, the aforementioned thickness range can also be employed for the gate dielectric material 12.

The gate conductor material 14 includes any conductive material including, for example, doped polycrystalline or amorphous silicon, germanium, silicon germanium, a metal (e.g., tungsten (W), titanium (Ti), tantalum (Ta), ruthenium (Ru), hafnium (Hf), zirconium (Zr), cobalt (Co), nickel (Ni), copper (Cu), aluminum (Al), platinum (Pt), tin (Sn), silver (Ag), gold (Au), a conducting metallic compound material (e.g., tantalum nitride (TaN), titanium nitride (TiN), tantalum carbide (TaC), titanium carbide (TiC), titanium aluminum carbide (TiAlC), tungsten silicide (WSi), tungsten nitride (WN), ruthenium oxide ($RuO_2$), cobalt silicide (CoSi), nickel silicide (NiSi)), transition metal aluminides (e.g., $Ti_3Al$, ZrAl), TaC, TaMgC, carbon nanotube, conductive carbon, graphene, or any suitable combination of these materials. The conductive material may further comprise dopants that are incorporated during or after deposition.

In some embodiments, a workfunction setting layer (not shown) may be located between the gate dielectric material 12 and the gate conductor material 14. The workfunction setting layer can be a workfunction metal (WFM). The WFM can be any suitable material, including but not limited a nitride, including but not limited to titanium nitride (TiN), titanium aluminum nitride (TiAlN), hafnium nitride (HfN), hafnium silicon nitride (HfSiN), tantalum nitride (TaN), tantalum silicon nitride (TaSiN), tungsten nitride (WN), molybdenum nitride (MoN), niobium nitride (NbN); a carbide, including but not limited to titanium carbide (TiC) titanium aluminum carbide (TiAlC), tantalum carbide (TaC), hafnium carbide (HfC), and combinations thereof. In some embodiments, a conductive material or a combination of multiple conductive materials can serve as both the gate conductor material 14 and the WFM.

The gate conductor material 14 and, if present, the WFM can be formed by any suitable process or any suitable combination of multiple processes, including but not limited to, atomic layer deposition (ALD), chemical vapor deposition (CVD), physical vapor deposition (PVD), sputtering, plating, evaporation, ion beam deposition, electron beam deposition, laser assisted deposition, chemical solution deposition, etc. When a metal silicide is formed, a conventional silicidation process is employed. In one embodiment, the gate conductor material 14 can have a thickness from 50 nm to 200 nm. Other thicknesses that are lesser than, or greater than, the aforementioned thickness range can also be employed for the gate conductor material 14.

The gate structure (12, 14) can be formed by providing a gate material stack of the gate dielectric material 12, and the gate conductor material 14. In a gate last process, a planarization process may follow the formation of the gate material stack. In a gate first process, a patterning process follows the formation of the gate material stack. In one embodiment, and when multiple gate structures are formed, each gate structure may be composed of the same gate dielectric material and/or gate conductor material. In another embodiment, and when multiple gate structures are formed, a first set of gate structures may be composed of a first gate dielectric material and a first gate conductor material, while a second set of gate structures may be composed of a second gate dielectric material and a second gate conductor material. In such an embodiment, the second gate conductor material is typically different from the first gate conductor material; the first and second gate dielectric materials may be the same or different. In such an embodiment, block mask technology may be used to provide gate structures that have at least different gate conductor materials.

The dielectric material stack 18 includes a plurality of dielectric material layers (levels) that are stacked one upon the other. The plurality of dielectric material layers (levels) may include one or more ILD material layers located at a bottom portion of the dielectric material stack and one of more interconnect dielectric material layers located at an upper portion of the dielectric material stack. The dielectric materials that provide the dielectric material stack 18 can be composed of a compositionally same dielectric material, or compositionally different dielectric materials.

The dielectric material stack 18 can include at least one of silicon dioxide, undoped silicate glass (USG), fluorosilicate glass (FSG), borophosphosilicate glass (BPSG), a spin-on low-k dielectric layer, and a chemical vapor deposition (CVD) low-k dielectric layer. The term "low-k" as used throughout the present application denotes a dielectric material that has a dielectric constant of less than 4.0. The dielectric material stack 18 can be formed by utilizing one or more deposition processes such as, for example, chemical vapor deposition (CVD), plasma enhanced chemical vapor deposition (PECVD), evaporation or spin-on coating. In some embodiments, and following the deposition of a particular dielectric material layer of the dielectric material stack 18, a planarization process such as, for example, chemical mechanical polishing (CMP) and/or grinding, may employed.

As mentioned above, dielectric material stack 18 contains a plurality of electrically conductive structures (19L, 19R, 20L, 20R, 21 and 22) embedded therein. The electrically conductive structures (19L, 19R, 20L, 20R, 21 and 22) can be formed utilizing techniques well known to those skilled in the art. In one embodiment, the electrically conductive structures (19L, 19R, 20L, 20R, 21 and 22) can be formed by a so-called damascene process. The damascene process includes providing an opening into a particular dielectric material layer of the dielectric material stack 18 and then filling the opening with a conductive metal-containing fill material. The filling may include any suitable deposition process such as, for example, chemical vapor deposition (CVD), plasma enhanced chemical vapor deposition (PECVD) or atomic layer deposition (ALD). The conductive metal-containing fill material can be composed of tungsten (W), aluminum (Al), copper (Cu), cobalt (Co), nickel (Ni), titanium (Ti), ruthenium (Ru), or any other suitable conductive metal or alloy thereof. A barrier layer (not show) that is composed of a barrier material that can prevent diffusion and/or alloying of the conductive metal-containing fill material with an underlying material may be formed into the opening prior to filling the opening with a conductive metal-containing fill material. Examples of barrier materials that may be employed in the present application include titanium nitride (TiN), tantalum nitride (TaN), hafnium nitride (HfN), niobium nitride (NbN), tungsten nitride (WN), tungsten carbon nitride (WCN), or any combination thereof. The barrier layer can be formed in the contact openings by a deposition process such as, for example, chemical vapor deposition (CVD), plasma enhanced chemical vapor deposition (PECVD), atomic layer deposition (ALD), or metalorganic chemical vapor deposition (MOCVD). A planarization process may follow the filling of each opening with the conductive metal-containing fill material.

In the present application, each of electrically conductive structures 19L, 19R can be referred to as a lower source/drain (S/D) contact structure since each electrically conductive structures 19L, 19R directly contacts one of the source/drain regions 16L, 16R. Each electrically conductive structures 20L, 20R can be referred to as an upper source/drain (S/D) contact structure. In some embodiments, the upper and lower S/D contact structures (19L, 19R, 20L, 20L) are of unitary construction (i.e., a single piece) and are composed of a same conductive metal-containing fill material. In other embodiments, the upper and lower S/D contact structures (19L. 19R, 20L, 20L) are separate pieces and are composed of a different conductive metal-containing fill material. Electrically conductive structure 21 can be referred to as a gate contact structure, while electrically conductive structure 22 can be referred to as a last metal level contact structure. As is shown, the electrically conductive structure 22 (i.e., the last metal level contact structure) has a topmost surface that is coplanar with a topmost surface of the uppermost dielectric material of the dielectric material stack 18. As is further shown, the electrically conductive structure 22 (i.e., the last metal level contact structure) is electrically connected to the gate structure (12, 14) by means of the electrically conductive structure 21 (i.e., the gate contact structure).

In some embodiments, the electrically conductive structures (19L, 19R, 20L, 20R, 21 and 22) may be composed of a compositionally same conductive metal-containing fill material. In other embodiments, a first set of the electrically conductive structures (19L, 19R, 20L, 20R, 21 and 22) may be composed of a first conductive metal-containing fill material, while a second set of the electrically conductive structures (19L, 19R, 20L, 20R, 21 and 22) may be composed of a second conductive metal-containing fill material that is compositionally different from the first conductive metal-containing fill material. Although shown as a single layer, the electrically conductive structure 22 (i.e., the last metal level contact structure) may comprise a multilayered structure such as contact vias and contact trenches. Similar and as stated above, the dielectric material stack 18 may include multiple layers (i.e., levels) of dielectric materials.

When present, the etch stop layer 24L is then formed on the uppermost dielectric material of the dielectric material stack 18 and on the electrically conductive structure 22 (i.e., the last metal level contact structure). As mentioned above, the etch stop layer 24L is optional and need not be employed in some embodiments of the present application. The etch stop 24L is composed of a dielectric material that is compositionally different from the uppermost dielectric material of the dielectric material stack 18 as well as the dielectric material layer 26L to be subsequently formed. In one embodiment, the etch stop layer 24L can be composed of silicon nitride or silicon oxynitride. Other dielectric materials for the etch stop layer 24L include, but are not limited to, dielectric metal oxides such as, for example, $Al_2O_3$ or $Ta_2O_5$. The etch stop layer 24L can be formed utilizing a deposition process such as, for example, chemical vapor deposition (CVD), plasma enhanced chemical vapor deposition (PECVD), atomic layer deposition (ALD), or physical vapor deposition (PVD). The etch stop layer 24L can have a thickness from 1 nm to 10 nm; although other thicknesses can be used in the present application for the thickness of the etch stop layer 24L.

The dielectric material layer 26L is composed of a dielectric material that is compositionally different from the dielectric material that provides the etch stop layer 24L. In one example, and when the etch stop 24L is composed of silicon nitride, the dielectric material layer 26L is composed of silicon dioxide. In embodiments in which the etch stop layer 24L is omitted, the dielectric material layer 26L is composed of a compositionally different dielectric material than the uppermost dielectric material of the dielectric material stack 18. The dielectric material layer 26L can be formed utilizing a deposition process such as, for example, chemical vapor deposition (CVD), plasma enhanced chemical vapor deposition (PECVD), atomic layer deposition (ALD), or physical vapor deposition (PVD). The dielectric material layer 26L can have a thickness from 1 micrometer to 1000 micrometers.

Figure 2:
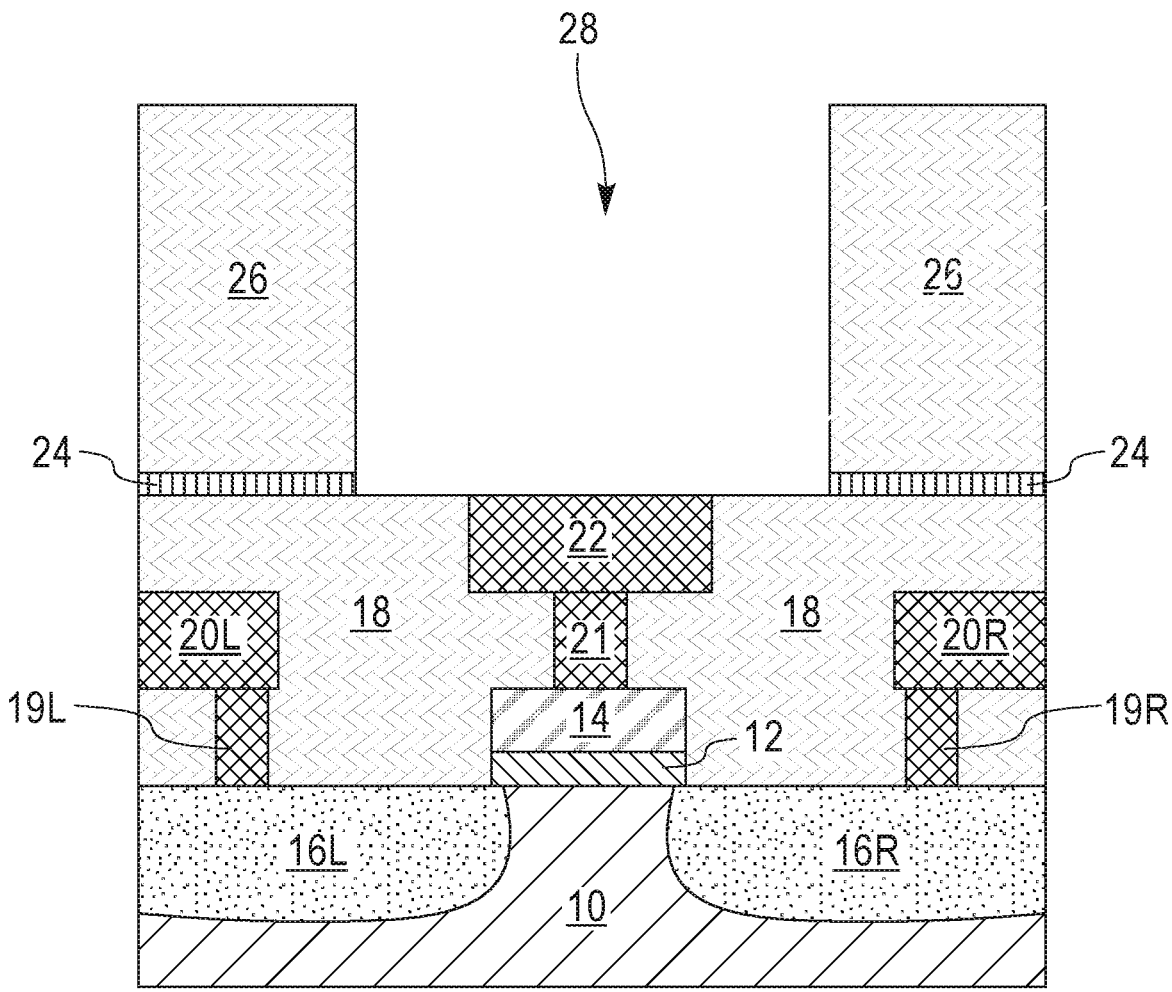
FIG. 2 is a cross sectional view of the exemplary structure of FIG. 1 after forming a micro-well into the dielectric material layer and the etch stop layer.

Referring now to FIG. 2, there is illustrated the exemplary structure of FIG. 1 after forming a micro-well 28 into the dielectric material layer 26L and, if present, the etch stop layer 24L. The term "micro-well" is used throughout the present application to denote an opening that is formed into the dielectric material layer 26L and, if present, the etch stop layer 24L which can subsequently act as a reservoir, i.e., basin, for receiving and holding an analyte-containing solution (or a gas, or an electrolyte-containing solution). In some embodiments, the micro-well 28 has a depth that is equal to the combined thickness of the dielectric material layer 26L and the etch stop layer 24L. In other embodiments, the micro-well 28 has a thickness that is equal to the thickness of the dielectric material layer 26L. The micro-well 28 can have a diameter from 100 nm to 5000 nm. In some embodiments, the diameter of the micro-well 28 is constant from top to bottom. In other embodiments, the diameter of the micro-well 28 may increase from top to bottom, or decrease from top to bottom.

The micro-well 28 can be formed by lithography and etching. Lithography includes forming a photoresist material on a material or material stack that needs to be patterned, exposing the photoresist material to a pattern of irradiation and developing the exposed photoresist material utilizing a conventional resist developer to provide a patterned photoresist. The etching used to form the micro-well 28 may include a first etching process that is selective in removing the dielectric material layer 26L not protected by the patterned photoresist, and a second etching process that is selective in removing the etch stop layer 24L. In one example, the first etching process includes etching with hydrofluoric acid or a buffered oxide etchant that includes a mixture of ammonium fluoride and hydrofluoric acid, and the second etching process includes etching with hot phosphoric acid. The patterned photoresist can be removed anytime after transferring the pattern into the dielectric material layer 26L utilizing a conventional resist removal process such as, for example, ashing. When the etch stop layer 24L is omitted, a single etch can be employed in forming the micro-well 28 into the dielectric material layer 26L. Alternatively, the micro-well 28 can be formed by a directional etch such as, for example, a reactive ion etch (RIE).

As is shown, the micro-well 28 physically exposes a portion of the dielectric material stack 18 as well as the electrically conductive structure 22 (i.e., the last metal level contact structure). As is further shown, the micro-well 28 physically exposes sidewalls of a remaining portion of the dielectric material layer 26L and, if present, a remaining portion of the etch stop layer 24L. The remaining portion of the dielectric material layer 26L can be referred to a dielectric material portion 26 and, if present, the remaining portion of the etch stop layer 24L can be referred to as an etch stop portion 24. In the illustrated embodiment, the dielectric material portion 26 and the etch stop portion 24 laterally surround the micro-well 28. Collectively, and in the illustrated embodiment, the dielectric material portion 26 and etch stop portion 24 provide a micro-well containing structure which houses micro-well 28. In embodiments in which the etch stop layer 24L is omitted, the dielectric material portion 26, itself, laterally surrounds the micro-well 28 and provides a micro-well containing structure which houses micro-well 28.

Figure 3:
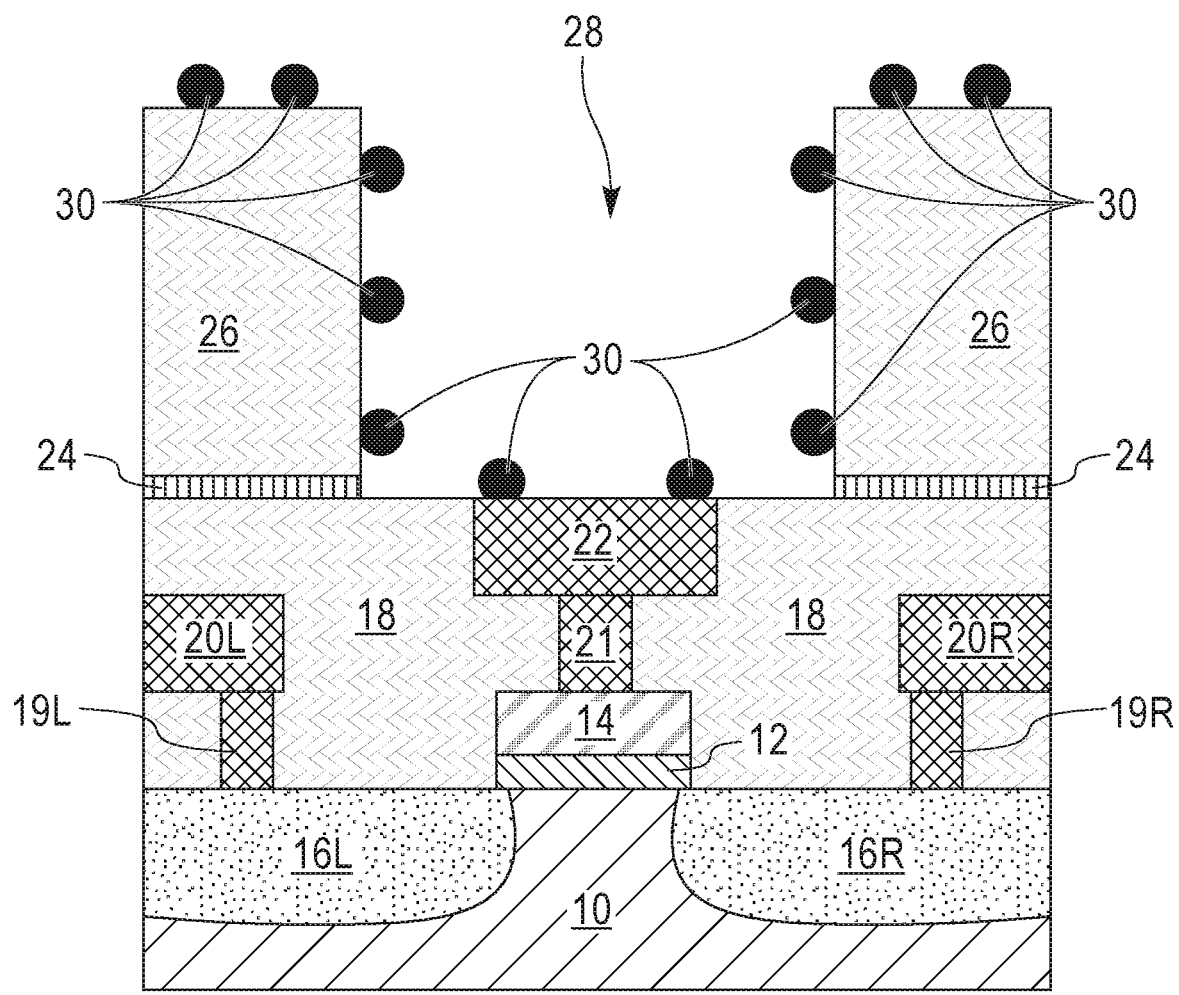
FIG. 3 is a cross sectional view of the exemplary structure of FIG. 2 after forming metal particles on physically exposed surfaces that are located inside and outside the micro-well.
Figure 10:
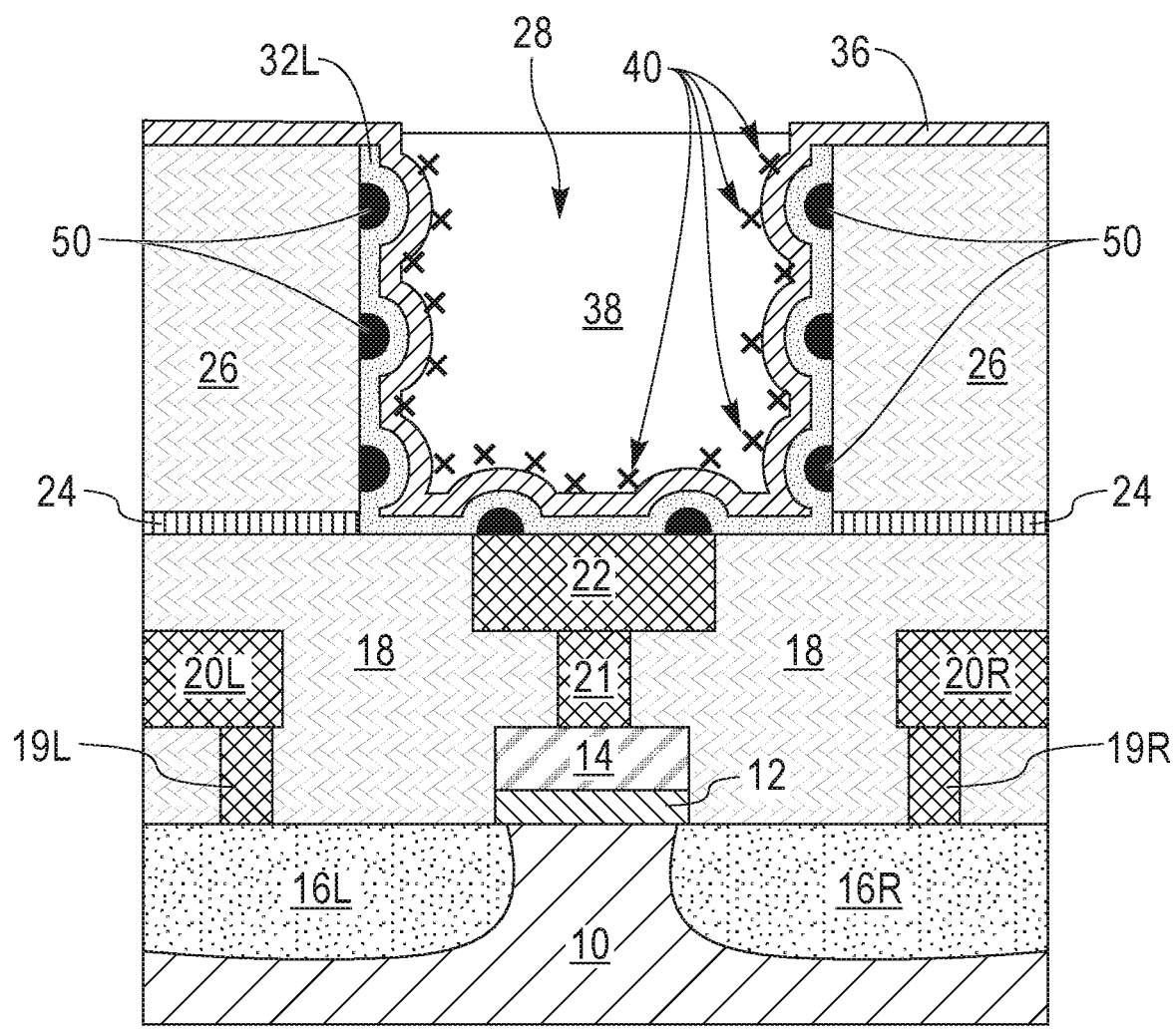
FIG. 10 is a cross sectional view of another exemplary structure that can be derived from the exemplary structure shown in FIG. 9.

Referring now to FIG. 3, there is illustrated the exemplary structure of FIG. 2 after forming metal particles 30 on physically exposed surfaces that are located inside and outside the micro-well 28. That is, the metal particles 30 are formed upon physically exposed surfaces of each of the dielectric material portion 26, the optional etch stop portion 24, the dielectric material stack 18, and the electrically conductive structure 22 (i.e., the last metal level contact structure). In another embodiment, as is shown in FIG. 10, non-metallic particles (i.e., semiconductor or dielectric) may be used in place of metal particles 30. The particles (i.e., metal, semiconductor or dielectric) are used in the present application to provide a rough surface which serves to increase the surface are of the subsequently formed passivation (or sensing) layer 36. The particles (i.e., metal, semiconductor or dielectric) thus can be referred to herein as surface roughening agents.

It is noted that the metal particles 30 do not entirely cover the physically exposed surfaces of each of the dielectric material portion 26, the optional etch stop portion 24, the dielectric material stack 18, and the electrically conductive structure 22 (i.e., the last metal level contact structure). Also, and although not shown, a metal particle 30 may be in direct physical contact with another metal particle 30.

The metal particles 30 may be spherical, as shown, or hemispherical (not shown in FIG. 3). The metal particles 30 may be composed of a conductive metal such as, for example, gold (Au), platinum (Pt), palladium (Pd), nickel (Ni), cobalt (Co), aluminum (Al), or silver (Ag). The metal particles 30 may have a particles size from 1 nm to 2000 nm. In some embodiments, the metal particles 30 are nanoparticles. By "nanoparticles" it is meant a particle having a particle size from 1 nm to 1000 nm.

In one embodiment, the metal particles 30 are formed providing a dispersion of metal particles in a solvent, and then dipping the structure shown in FIG. 2 into the dispersion of metal particles. In another embodiment, the metal particles 30 can be formed by depositing a layer of metal and thereafter applying local heat to the deposited layer of metal until the layer of metal coalesces into individual metal particles 30. The heating may be performed at a temperature from 400° C. or greater. In one embodiment, the heating is provided by a laser anneal to produce heat localized to the layer of metal to minimize heating the other material layers of the exemplary structure of the present application.

Figure 4:
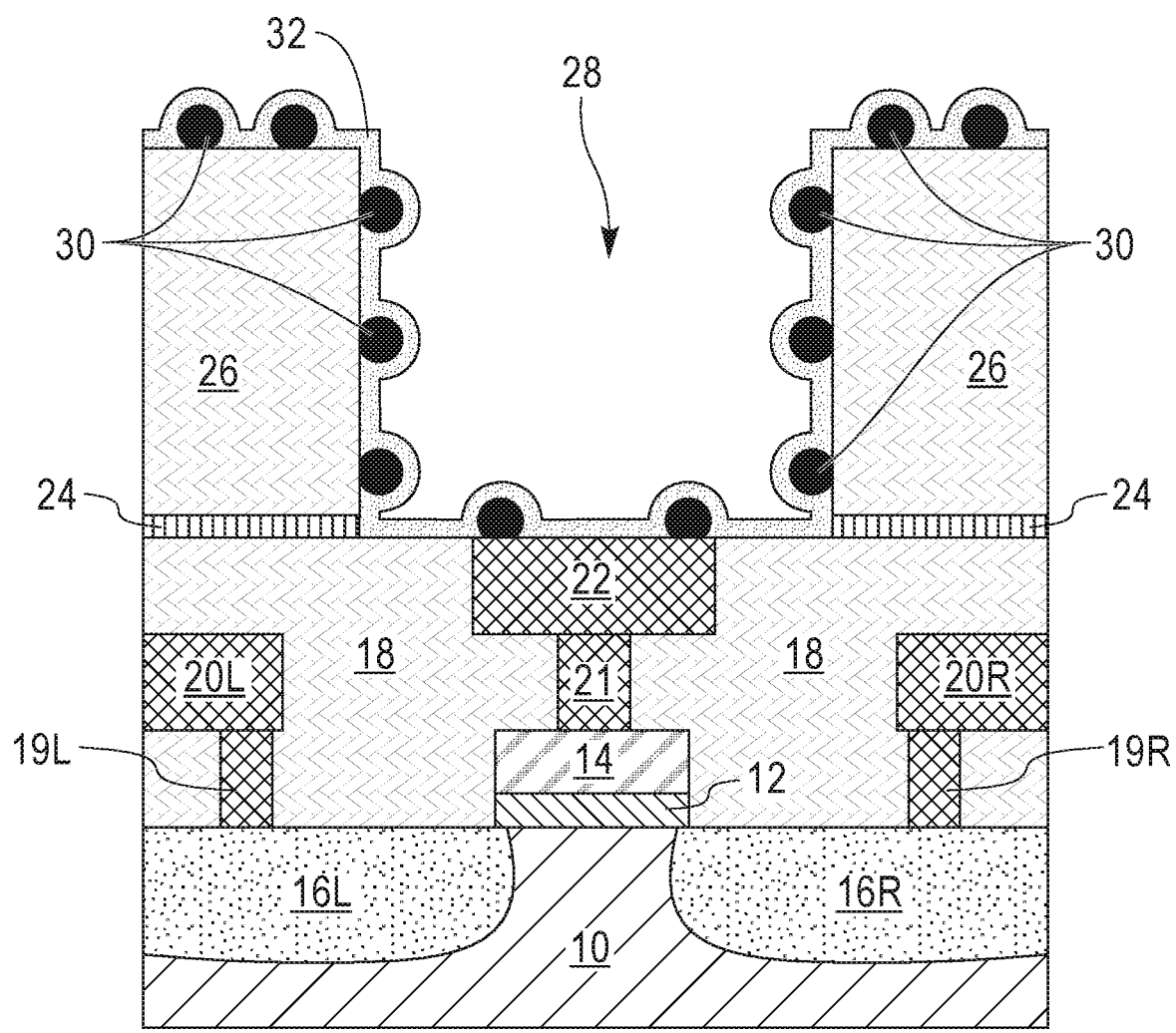
FIG. 4 is a cross sectional view of the exemplary structure of FIG. 3 after forming an electrically conductive layer inside and outside the micro-well.

Referring now to FIG. 4, there is illustrated the exemplary structure of FIG. 3 after forming an electrically conductive layer 32 inside and outside the micro-well 28. The electrically conductive layer 32 electrically connects all metal particles 30 together, and embeds each of the metal particles 30. The metal particles 30 provide a rough surface to the electrically conductive layer 32.

In some embodiments, the electrically conductive layer 32 is conformal. The term "conformal" denotes that a material layer has a vertical thickness along horizontal surfaces that is substantially the same (i.e., within ±5%) as the lateral thickness along vertical surfaces. A conformal electrically conductive layer 32 can be formed utilizing any conformal deposition process such as, for example, chemical vapor deposition (CVD), plasma enhanced chemical vapor deposition (PECVD), or atomic layer deposition (ALD).

In other embodiments, the electrically conductive layer 32 is non-conformal. A non-conformal electrically conductive layer 32 can be formed by a deposition process such as, for example, atomic layer deposition (ALD), chemical vapor deposition (CVD), sputtering or physical vapor deposition (PVD).

In one embodiment, the electrically conductive layer 32 may be composed of a compositionally same metal as the metal particles 30. In another embodiment, the electrically conductive layer 32 may be composed of a compositionally different metal as the metal particles 30. In yet other embodiments, the electrically conductive layer 32 may be composed conductive metal alloy. In one example, and when the metal particles 30 are composed of one of Au, Pt, Pd, Ni, Co, Al, and Ag, then the electrically conductive layer 32 can be composed of ruthenium (Ru).

The electrically conductive layer 32 may have a thickness from 5 nm to 50 nm; although other thicknesses can also be used as the thickness of the electrically conductive layer 32.

Figure 5:
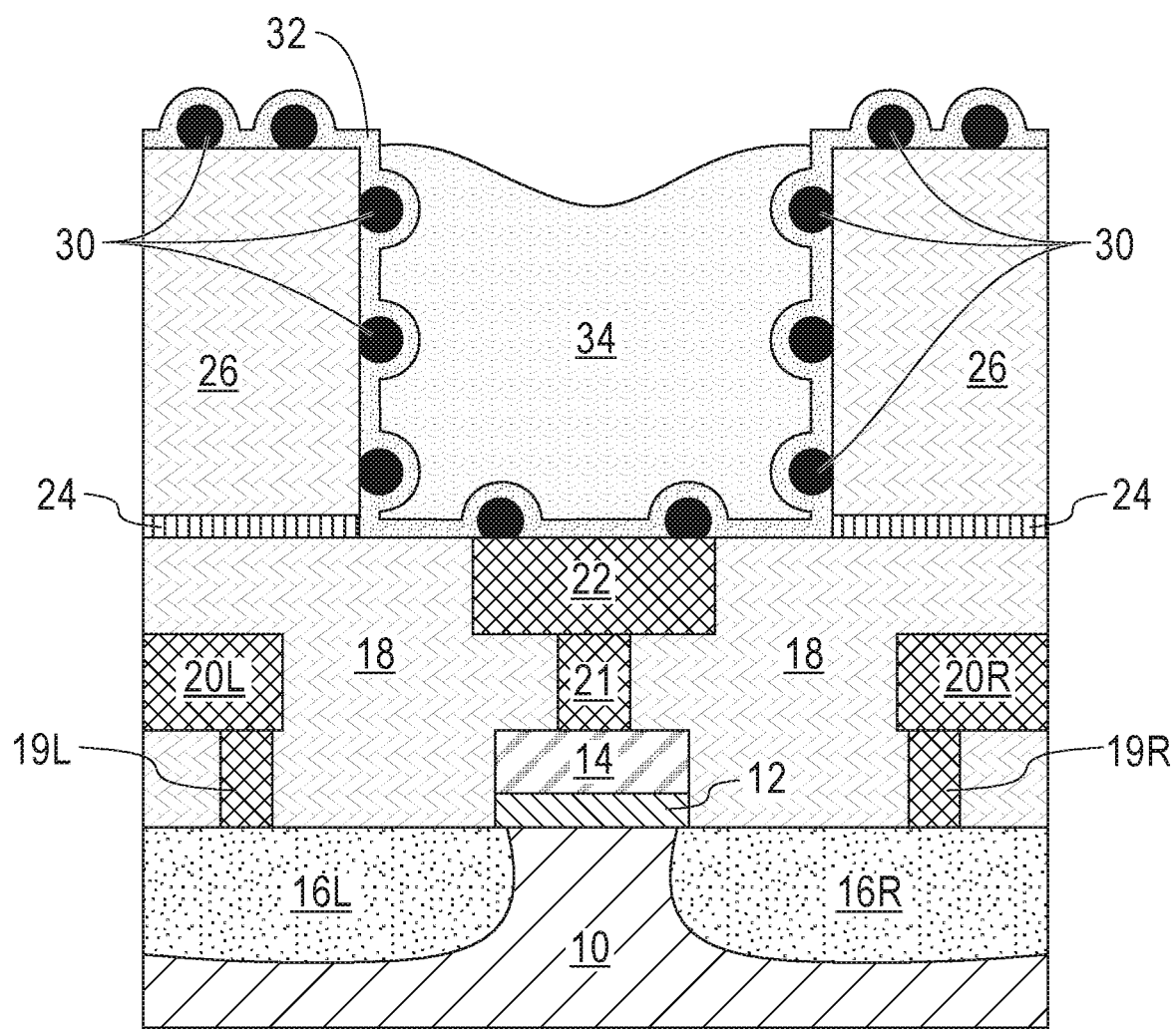
FIG. 5 is a cross sectional view of the exemplary structure of FIG. 4 after forming a sacrificial material inside the micro-well.

Referring now to FIG. 5, there is illustrated the exemplary structure of FIG. 4 after forming a sacrificial material 34 inside the micro-well 28. Sacrificial material 34 may include any material that can be selectively removed compared to the electrically conductive layer 32. In one embodiment, the sacrificial material 34 is composed of an amorphous silicon germanium alloy. In other embodiments, the sacrificial material 34 can be composed of amorphous carbon or an organic polymer such as, for example, an optical planarization layer (OPL). The sacrificial material 34 may be formed utilizing any well-known deposition process such as, for example, chemical vapor deposition (CVD) or plasma enhanced chemical vapor deposition (CVD). The sacrificial material 34 completely fills the entirety of the micro-well 28, and leaves the surface roughened electrically conductive layer 32 located outside the micro-well 28 physically exposed.

Figure 6:
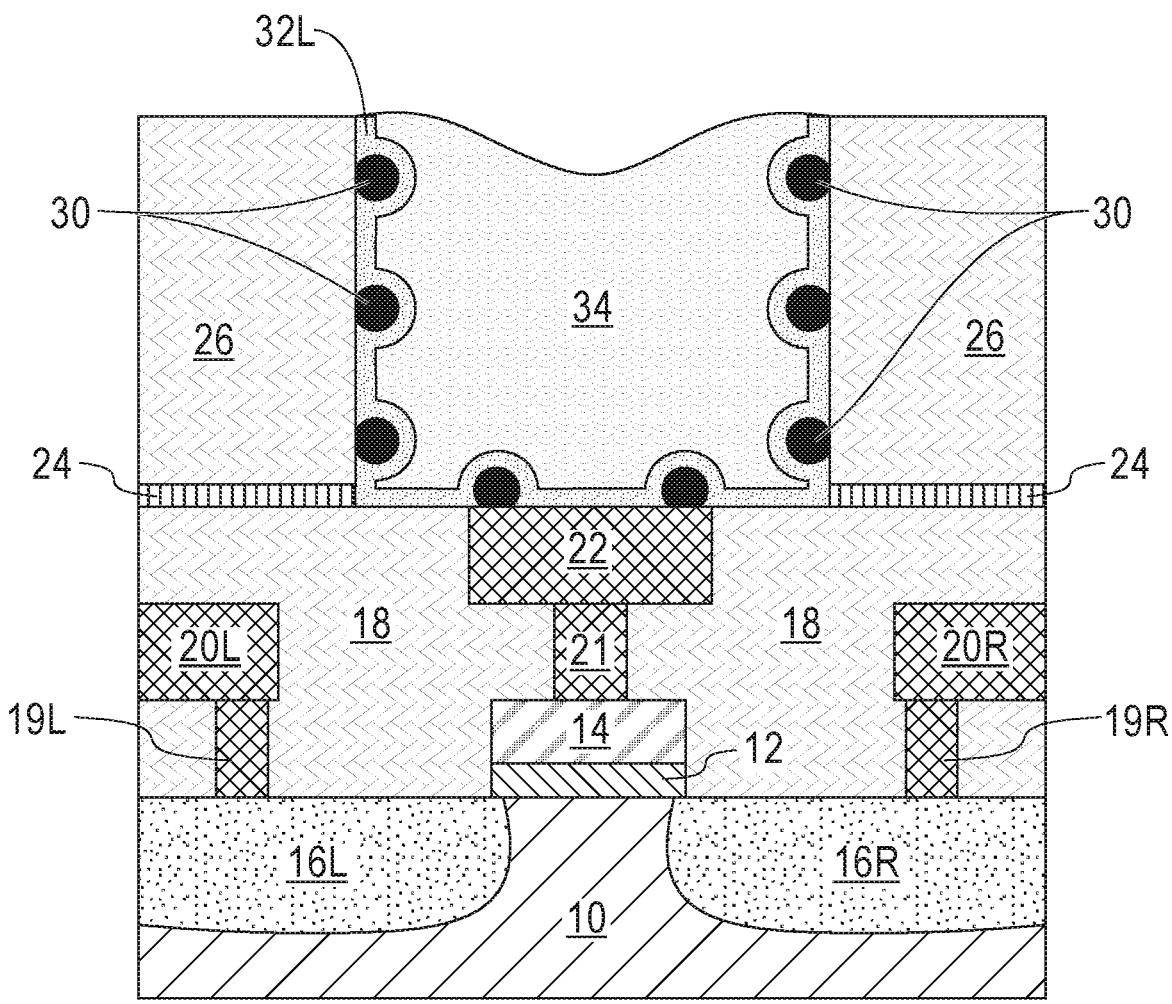
FIG. 6 is a cross sectional view of the exemplary structure of FIG. 5 after removing the electrically conductive layer and the metal particles that are located outside the micro-well.

Referring now to FIG. 6, there is illustrated the exemplary structure of FIG. 5 after removing the electrically conductive layer 32 and the metal particles 30 that are located outside the micro-well 28. The removal of the electrically conductive layer 32 and the metal particles 30 that are located outside the micro-well 28 is performed utilizing the sacrificial material 34 as mask. The removal of the electrically conductive layer 32 and the metal particles 30 that are located outside the micro-well 28 may be performed utilizing one or more material removal processes. In one example, chemical mechanical polishing (CMP) may be used to remove the electrically conductive layer 32 and the metal particles 30 that are located outside the micro-well 28. In another example, a first etching step is used to remove the electrically conductive layer 32 that is located outside the micro-well 28, and a second etch is used to remove the metal particles 30 that are located outside the micro-well 28.

A portion of the electrically conductive layer 32 as well as the metal particles 30 remain inside the micro-well 28. The remaining portion of the electrically conductive layer 32 that is located inside the micro-well 28 can be referred to as an electrically conductive liner 32L. The electrically conductive liner 32L has a rough surface as provided by the metal particles 30 that remain in the micro-well 28. The electrically conductive liner 32L typically has a topmost surface that is coplanar with a topmost surface of the dielectric material structure 26.

Figure 7:
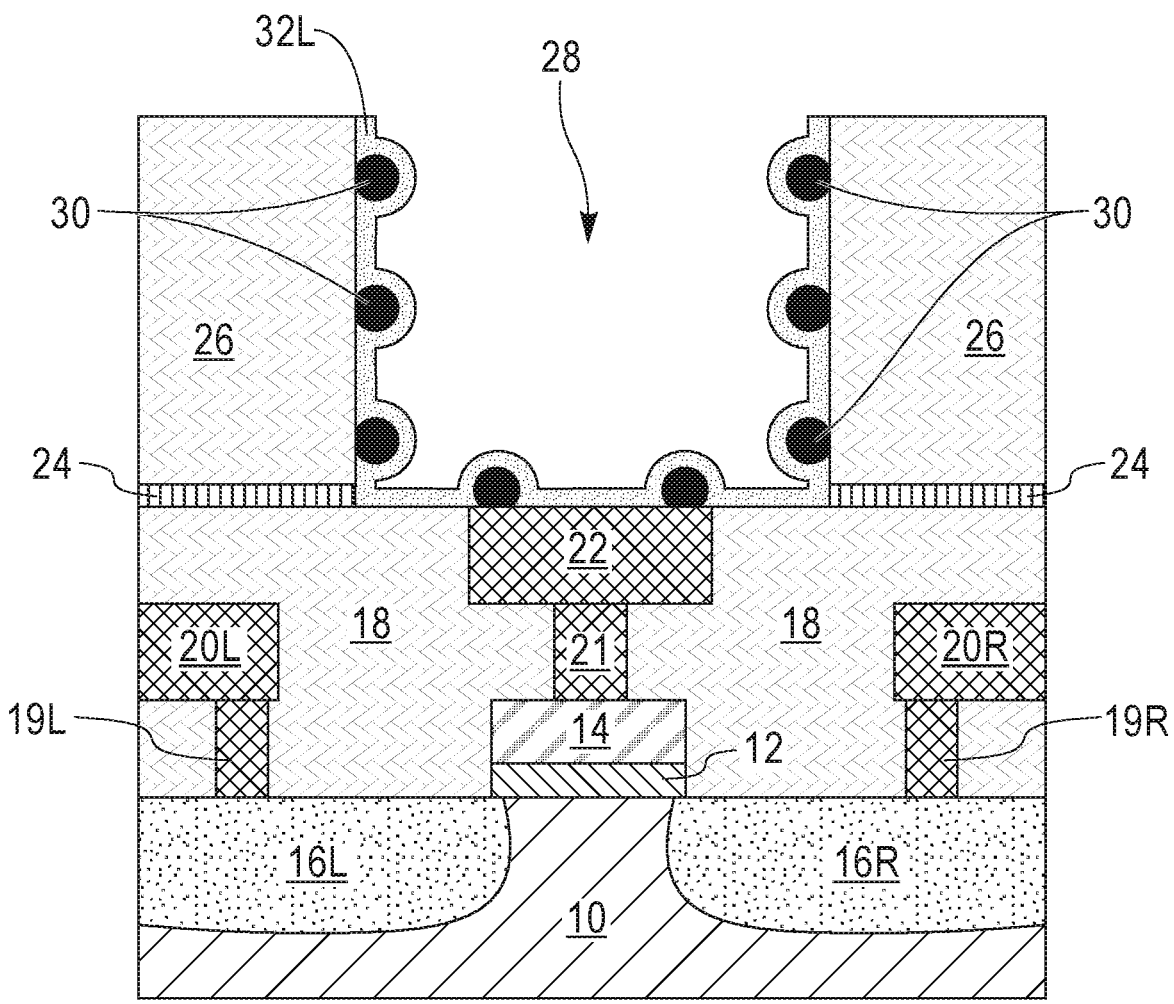
FIG. 7 is a cross sectional view of the exemplary structure of FIG. 6 after removing the sacrificial material located inside the micro-well.

Referring now to FIG. 7, there is illustrated the exemplary structure of FIG. 6 after removing the sacrificial material 34 located inside the micro-well 28. As is shown, the removal of the sacrificial material 34 physically exposes the electrically conductive liner 32L having the rough surface provided by metal particles 30. The removal of the sacrificial material 34 may be performed utilizing a material removal process that is selective in removing the sacrificial material 34 that is located inside the micro-well 28. In one example, and when an amorphous silicon germanium alloy is used as the sacrificial material 34, the removal can include etching with an aqueous solution containing hydrogen peroxide ($H_2O_2$).

Although not shown, it is possible to change the method of the present application such that metal particles 30 are removed outside the micro-well 28 prior to forming the electrically conductive layer 32. In such an embodiment, the sacrificial material 34 is formed into the micro-well 28 prior to forming the electrically conductive layer 32. A material removal process is then employed to remove the metal particles 30 located outside the micro-well 28, and thereafter the sacrificial material 34 is removed. Next, the electrically conductive layer 32 is formed and a planarization process can be used to remove the electrically conductive layer 32 that is located outside the micro-well 28 and provide electrically conductive liner 32L. In some embodiments, the metal particles 30 can be formed only inside the micro-well 28 and thereafter the electrically conductive liner 32L can be formed inside the micro-well 28 so as to embed the metal particles 30 in the micro-well 28.

Figure 8:
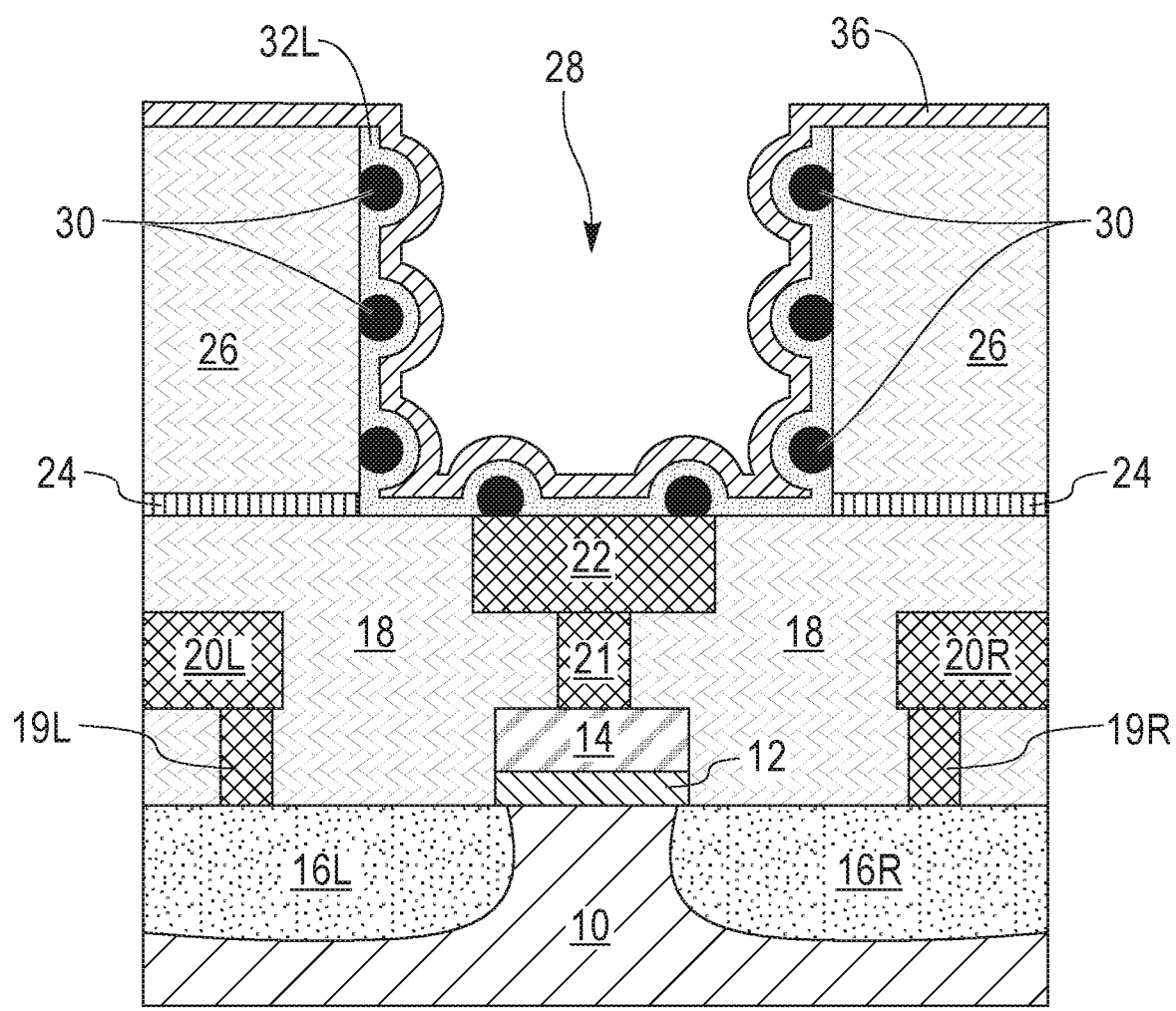
FIG. 8 is a cross sectional view of the exemplary structure of FIG. 7 after forming a passivation layer.

Referring now to FIG. 8, there is illustrated the exemplary structure of FIG. 7 after forming a passivation layer 36. The passivation layer 36 is formed on the electrically conductive liner 32L having the rough surface provided by metal particles 30 as well as on the topmost surface of the dielectric material portion 26. The passivation layer 36 that is located inside the micro-well 28 has a rough surface and an increased surface area due to the metal particles 30 as compared to the passivation layer 36 that is located outside the micro-well 28. The passivation layer 36 can be referred to as a sensing layer.

The passivation layer 36 is composed of a dielectric material that can prevent air, ions and/or moisture from diffusing therethrough, but is capable of absorbing electric charge that is present in an analyte-containing solution that is subsequently introduced into the micro-well 28. In one embodiment, the passivation layer 36 may be composed of silicon nitride, silicon oxynitride, metal oxides (such as aluminum oxide, tantalum oxide, hafnium oxide, titanium oxide, aluminum nitride), polymers, organic nanodielectric materials, or self-assembled monolayers (SAMs) such as APTES (3-aminopropyltriethoxysilane).

The passivation layer 36 can be formed utilizing a deposition process such as, for example, chemical vapor deposition (CVD), plasma enhanced chemical vapor deposition (PECVD), atomic layer deposition (ALD) or spin-on coating. The passivation layer 36 can have a thickness from 10 nm to 100 nm; although other thicknesses can be used in the present application for the thickness of the passivation layer 36. The passivation layer 36 is typically a conformal layer. The passivation layer 36 inside the micro-well 28 has a surface area that is greater than a surface area of the passivation layer 36 located outside the micro-well 28.

Figure 9:
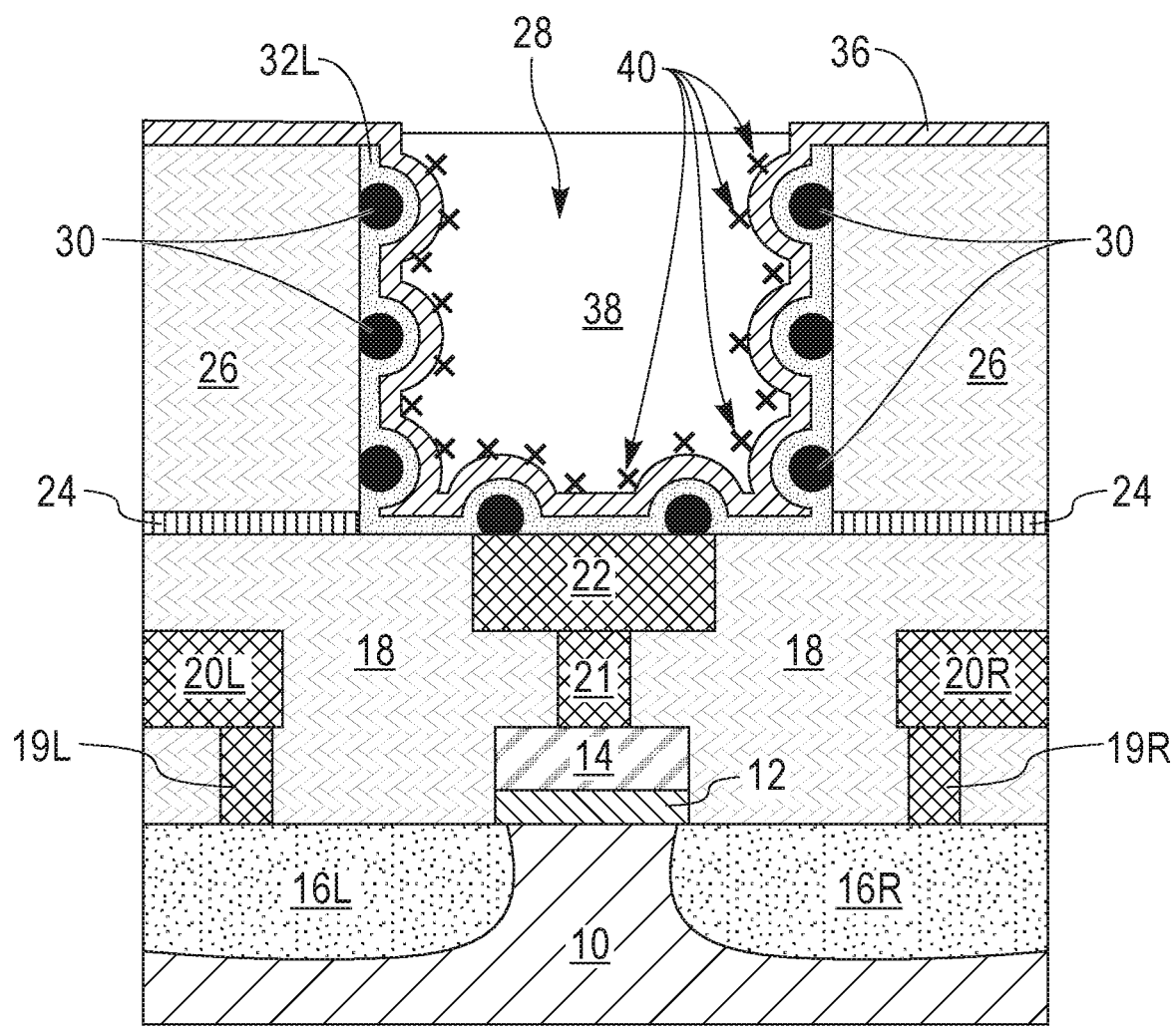
FIG. 9 is a cross sectional view of the exemplary structure of FIG. 8 after providing an analyte-containing solution to the micro-well.

Referring now to FIG. 9, there is illustrated the exemplary structure of FIG. 8 after providing (i.e., introducing) an analyte-containing solution 38 to the micro-well 28. The term "analyte" is used throughout the present application to denote a substance (either chemical or biological), or a chemical or biological constituent that can be subject to analyses and detection by ISFET sensing. That is, the analyte is composed of a chemical or biological material that has, or can generate an electric charge 40, in a solution (aqueous or non-aqueous (polar or non-polar)) such that the amount of electrical charge 40 in the analyte-containing solution 38 can be measured by the threshold voltage change of the underlying FET.

Illustrative analytes that can be employed in the present include, but are not limited to, glucose, DNA, RNA, or ions. The analyte-containing solution 38 can be introduced into the micro-well 28 utilizes techniques that are well known to those skilled in the art. For example, and in one embodiment, the analyte-containing solution 38 can be pumped from an external reservoir (not shown) to the micro-well 28 where analysis and detection of the analyte in the analyte-containing solution 38 occurs by the mechanism mentioned above. Alternatively, the exemplary structure shown in FIG. 9 (and FIG. 10 to follow) can be used as gas sensor or electrolyte sensor.

FIG. 9 illustrates an exemplary ion-sensitive field effect transistor (ISFET) of the present application. The exemplary ISFET of FIG. 9 has increased passivation capacitance, $C_p$, due to the increased surface area provided to the passivation layer (i.e., the sensing layer) 36 by the metal particles 30, and due to the presence of the electrically conductive liner 32L having the rough surface. The increased $C_p$ in turn provides enhanced sensitivity.

Notably, the ISFET of FIG. 9 includes a functional gate structure (12/14) located on a surface of a semiconductor material substrate 10 and embedded in a dielectric material stack 18. A micro-well 28 is located above the dielectric material stack 18 and physically exposes a portion of the dielectric material stack 18 that is located above the functional gate structure (12/14). The micro-well 28 is laterally surrounded by a micro-well containing structure (24/26 or just 26). A plurality of particles (e.g., metal particles 30) is located inside the micro-well 28 and on physically exposed sidewalls of the micro-well containing structure (24/26 or just 26) and the physically exposed portion of the dielectric material stack 18. An electrically conductive liner 32L is located in the micro-well 28 and embeds each particle of the plurality of particles; liner 32L has a rough surface. A sensing layer (i.e., passivation layer 36) is located on the electrically conductive liner 32L and extends onto a topmost surface of the micro-well containing structure (24/26 or just 26).

Referring now to FIG. 10, there is illustrated another exemplary structure that can be derived from the exemplary structure shown in FIG. 9. In this embodiment, the metal particles 30 of the previous embodiment are replaced with semiconductor or dielectric particles (hereinafter non-metallic particles 50). In some embodiments, the non-metallic particles 50 may be spherical. In other embodiments, and as shown in FIG. 10, the non-metallic particles 50 may be hemispherical.

The semiconductor particles may be composed of any semiconductor material having semiconducting properties. In one example, the semiconductor particles are composed of silicon. In another embodiment, the semiconductor particles are composed of hemispherical grained silicon.

The dielectric particles may be composed of an electrically insulating material that may be compositionally the same as, or compositionally different from the etch stop layer 24L. In one example, the dielectric particles may be composed of silica. In another example, the dielectric particles may be composed of silicon dioxide.

The non-metallic particles 50 can be formed by dip-coating in which a dispersion of the non-metallic particles in a solution is provided and then the structure shown in FIG. 2 is dipped into the dispersion. Alternatively, the non-metallic particles can be formed utilizing a deposition process.

FIG. 10 illustrates another exemplary ion-sensitive field effect transistor (ISFET) of the present application. The exemplary ISFET of FIG. 10 has increased passivation capacitance, $C_p$, due to the increased surface area provided to the passivation layer (i.e., the sensing layer) 36 by the non-metallic particles 50, and due to the presence of the electrically conductive liner 32L having the rough surface. The increased $C_p$ in turn provides enhanced sensitivity.

Notably, the ISFET of FIG. 10 includes a functional gate structure (12/14) located on a surface of a semiconductor material substrate 10 and embedded in a dielectric material stack 18. A micro-well 28 is located above the dielectric material stack 18 and physically exposes a portion of the dielectric material stack 18 that is located above the functional gate structure (12/14). The micro-well 28 is laterally surrounded by a micro-well containing structure (24/26 or just 26). A plurality of particles (e.g., non-metallic particles 50) is located inside the micro-well 28 and on physically exposed sidewalls of the micro-well containing structure (24/26 or just 26) and the physically exposed portion of the dielectric material stack 18. An electrically conductive liner 32L is located in the micro-well 28 and embeds each particle of the plurality of particles. A sensing layer (i.e., passivation layer 36) is located on the electrically conductive liner 32L and extends onto a topmost surface of the micro-well containing structure (24/26 or just 26).

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. An ion-sensitive field effect transistor (ISFET) comprising:
    a functional gate structure located on a surface of a semiconductor material substrate and embedded in a dielectric material stack;
    a micro-well located above the dielectric material stack and physically exposing a portion of the dielectric material stack that is located above the functional gate structure, wherein the micro-well is laterally surrounded by a micro-well containing structure;
    a plurality of particles located inside the micro-well and on physically exposed sidewalls of the micro-well containing structure and the physically exposed portion of the dielectric material stack;
    an electrically conductive liner located in the micro-well and embedding each particle of the plurality of particles; and
    a sensing layer located on the electrically conductive liner and extending onto a topmost surface of the micro-well containing structure.

2. The ISFET of claim 1, wherein the particles are metal particles.

3. The ISFET of claim 2, wherein the metal particles are spherical or hemispherical.

4. The ISFET of claim 1, wherein the particles are composed of a semiconductor material or a dielectric material.

5. The ISFET of claim 4, wherein the particles are spherical or hemispherical.

6. The ISFET of claim 1, wherein the dielectric material stack comprises at least a last metal level contact structure embedded therein, wherein the last metal level gate structure electrically contacts a gate conductor material of the functional gate structure, and wherein the micro-well physically exposes the last metal level contact structure.

7. The ISFET of claim 1, wherein the micro-well containing structure comprises, from bottom to top, an etch stop portion and a dielectric material portion.

8. The ISFET of claim 1, wherein the electrically conductive liner comprises ruthenium (Ru) and the particles are metal particles composed of one of gold (Au), platinum (Pt), palladium (Pd), nickel (Ni), cobalt (Co), aluminum (Al), or silver (Ag).

9. The ISFET of claim 1, further comprising an analyte-containing solution present in the micro-well, wherein the analyte-containing solution contains an electrical charge provided by the analyte that is absorbed by the sensing layer.

10. The ISFET of claim 9, wherein a concentration of electrical charge is measured by a change in threshold voltage of the ISFET.

11. A method of forming an ion-sensitive field effect transistor (ISFET), the method comprising:
    forming a structure comprising a functional gate structure on a surface of a semiconductor material substrate and embedded in a dielectric material stack, and a dielectric material layer located on dielectric material stack;
    forming a micro-well into the dielectric material layer and physically exposing a portion of the dielectric material particles;
    forming particles on physically exposed surfaces that are located at least inside the micro-well;
    forming an electrically conductive liner inside the micro-well and embedding each particle; and
    forming a passivation layer inside and outside of the micro-well.

12. The method of claim 11, wherein the particles are metal particles and have a spherical or hemispherical shape.

13. The method of claim 11, wherein the particles are semiconductor or dielectric particles and have a spherical or hemispherical shape.

14. The method of claim 11, wherein the forming of the particles comprises:
    providing a dispersion of the particles in a solution; and
    dipping the structure containing the micro-well into the solution.

15. The method of claim 11, wherein the forming of the particles comprises:
    forming a metal layer on the structure containing the micro-well; and
    locally heating the metal layer to coalesce the metal layer into the particles.

16. The method of claim 11, wherein the forming of the electrically conductive liner inside the micro-well and embedding each particle comprises:

depositing an electrically conductive layer inside and outside the micro-well; and removing the electrically conductive layer that is located outside the micro-well.

17. The method of claim 11, wherein the dielectric material stack comprises at least a last metal level contact structure embedded therein, wherein the last metal level gate structure electrically contacts a gate conductor material of the functional gate structure, and wherein the micro-well physically exposes the last metal level contact structure.

18. The method of claim 11, wherein the passivation layer is composed of a dielectric material that is capable of absorbing electric charge.

19. The method of claim 11, wherein the electrically conductive liner comprises ruthenium (Ru) and the particles are metal particles composed of one of gold (Au), platinum (Pt), palladium (Pd), nickel (Ni), cobalt (Co), aluminum (Al), or silver (Ag).

20. The method of claim 11, further comprising introducing an analyte-containing solution into the micro-well, wherein the analyte-containing solution contains an electrical charge provided by the analyte that is absorbed by the passivation layer.

* * * * *